(12) United States Patent
Grobert

(10) Patent No.: US 6,327,298 B1
(45) Date of Patent: Dec. 4, 2001

(54) POST-CORRELATION TEMPORAL NULLING

(75) Inventor: Paul H. Grobert, Granada Hills, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/233,623

(22) Filed: Jan. 19, 1999

(51) Int. Cl.$^7$ .................................................. H04L 27/30
(52) U.S. Cl. .......................... 375/148; 375/150; 342/378; 342/383
(58) Field of Search ..................... 375/137, 145, 375/144, 148, 149, 150, 147, 279, 284, 285, 346, 142, 143, 152, 343, 367; 342/378, 383

(56) References Cited

U.S. PATENT DOCUMENTS

| | | |
|---|---|---|
| 4,734,701 | 3/1988 | Grobert . |
| 5,317,322 * | 5/1994 | Grobert ................................. 342/378 |
| 6,160,841 * | 12/2000 | Stansell, Jr. et al. ................ 375/148 |

* cited by examiner

Primary Examiner—Chi Pham
Assistant Examiner—Dung X. Nguyen

(74) Attorney, Agent, or Firm—Colin M. Raufer; Leonard A. Alkov; Glen H. Lenzen, Jr.

(57) ABSTRACT

A post-correlation nulling circuit (10) derives from a narrowband jammer a replica of the baseband jammer noise which is used to adaptively cancel the jammer noise waveform in the receiver baseband after PN processing, thus allowing the adaptive antenna spatial nulling to concentrate on canceling wideband jammers. In particular, the post-correlation nulling circuit (10) includes a correlator (14) for correlating the received interference signal and received code modulated signal with a replicate code to generate an interference noise signal and a demodulated signal, a first processor (16) (18) for generating actual orthogonal interference signals based upon the actual interference noise signal, a generator (28) for producing a replicate interference signal having a frequency and waveform substantially similar to the received interference signal, a second processor (30) (32) for generating replicate orthogonal signals based upon the replicate interference signal and encoding the replicate orthogonal signals with the replicate code to generate replicate noise signals, a weighting network (42) (44) for weighting the replicate noise signals to generate weighted replicate noise signals, and a combiner (52) for combining the weighted replicate noise signals with the actual orthogonal interference signals produce a sum signal (26) in which the actual orthogonal interference signals are nulled.

20 Claims, 3 Drawing Sheets

POST-CORRELATION TEMPORAL NULLING

BACKGROUND OF THE INVENTION

1. Field of the Invention

The present invention relates generally to nullification of interference signals, and more particularly to nullification of interference signals in a receiver system utilizing post-correlation temporal nulling.

2. Description of the Prior Art

A number of different techniques are used to decrease the effects of interference signals, particularly jamming signals, in receivers. Interference signals may be due to jamming signals, reflection of the transmitted signal or interference from other signals. Jamming signals are often narrowband such as continuous wave (CW-sinusoidal), modulated or narrowband noise like in nature and are designed to disturb the operation of the receiver. Countering the effects of jamming signals in global positioning system (GPS) receivers, which require the reception of numerous signals to derive a location from satellites at random locations, is particularly difficult.

Various techniques have been used to decrease the interference level in such receivers. One such technique for minimizing the effects of interference signals, particularly caused by jamming schemes, is adaptive antenna spatial nulling. Adaptive spatial nulling rejects interference signals by reducing the directional sensitivity of the receiver antenna in the direction of the interfering signal. Another well known adaptive nulling technique utilizes an adaptive transversal filter in the form of a tapped delay line for "pre-correlation" temporal nulling for canceling narrowband jammers.

Use of the above described temporal nulling technique has various drawbacks, particularly when used with a GPS receiver, such as Assignee's Anti-Jam GPS Receiver (AGR), which utilizes a "post-correlation" nulling approach for implementing adaptive spatial interference cancellation. In particular, to use the above described technique with the AGR receiver, a transversal filter must be positioned in front of each antenna processing channel. For example, for a receiver adapted to receive signals from a five-element antenna array, five independent transversal filters would have to be utilized, one filter being placed after each antenna element. The increased cost and space requirements associated with such an implementation renders the above approach impractical in most cases.

"Post-correlation" temporal nulling has not been successfully implemented in the past due to the fact that after pseudo-noise (PN) code spreading in a PN receiver, a narrowband jammer, e.g., continuous wave (CW) interference, is "spread out" such that its waveform is transformed into a Gaussian noise waveform in the receiver baseband.

What is needed therefore is a post-correlation temporal nulling system for use with the AGR receiver which is practical, economical and space efficient.

SUMMARY OF THE INVENTION

The preceding and other shortcomings of the prior art are addressed and overcome by the present invention which provides a circuit for nulling a received interference signal from a received code modulated signal. The circuit includes a correlator for correlating the received interference signal and received code modulated signal with a replicate code to generate an interference noise signal and a demodulated signal, a first processor for generating actual orthogonal interference signals based upon the actual interference noise signal, a generator for producing a replicate interference signal having a frequency and waveform substantially similar to the received interference signal, a second processor for generating replicate orthogonal signals based upon the replicate interference signal and encoding the replicate orthogonal signals with the replicate code to generate replicate noise signals, a weighting network for weighting the replicate noise signals to generate weighted replicate noise signals, and a combiner for combining the weighted replicate noise signals with the actual orthogonal interference signals to produce a sum signal in which the actual orthogonal interference signals are nulled.

In another aspect, the present invention provides a method for nulling a received interference signal from a received code modulated signal, including the steps of correlating the received interference signal and received code modulated signal with a code which is a replica of the received code to generate an actual interference noise signal and a demodulated signal, generating actual orthogonal interference signals based upon the actual interference noise signal, generating a replicate interference signal having a frequency and waveform substantially similar to the received interference signal, generating replicate orthogonal signals based upon the replicate interference signal and encoding the replicate orthogonal signals with the replica code to generate replicate noise signals and weighting the replicate noise signals to generate weighted replicate noise signals, and combining the weighted replicate noise signals with the actual orthogonal interference signals to produce a sum signal in which the actual orthogonal interference signals are nulled.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

DETAILED DESCRIPTION OF THE PREFERRED EMBODIMENTS

Figure 1:
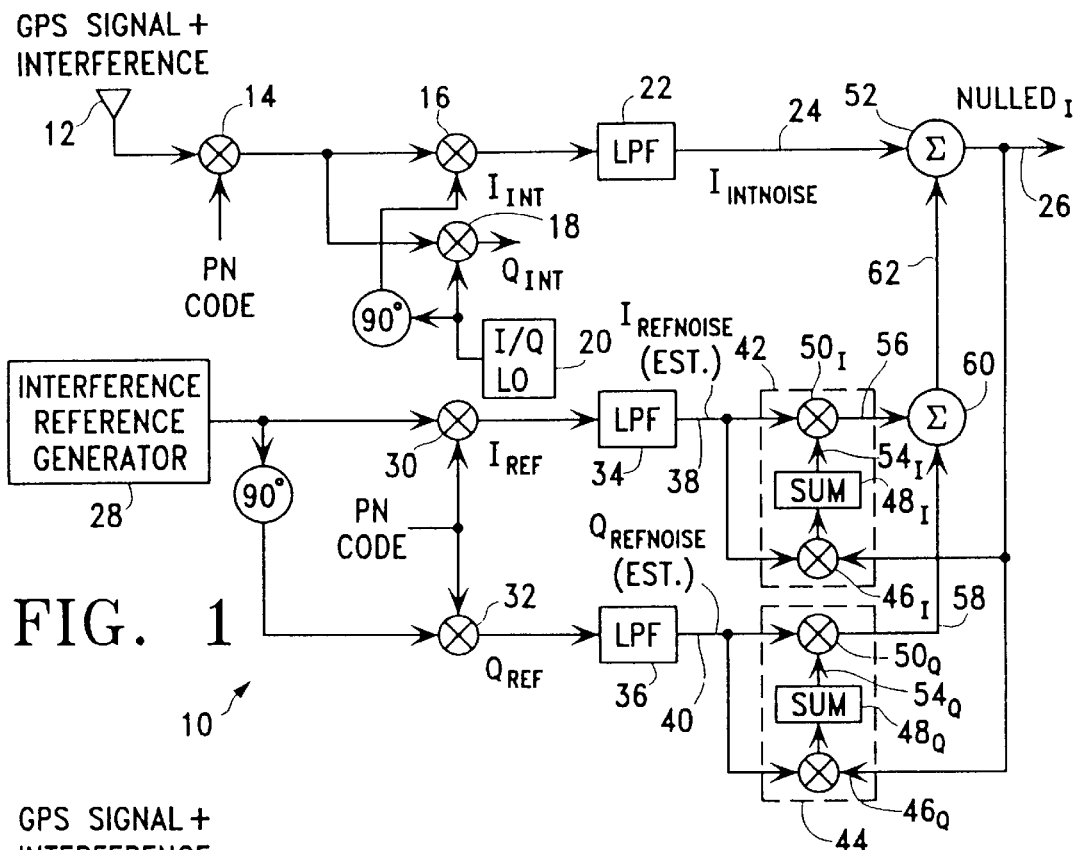
FIG. 1 is a simplified schematic block diagram of a post-correlation temporal nulling circuit in accordance with a preferred embodiment of the present invention.

Referring to FIG. 1, a post-correlation temporal nulling circuit 10 in a GPS receiver system is illustrated. As is illustrated in FIGS. 1–4 and described in detail below, the post-correlation nulling circuit 10 derives from a narrowband jammer a replica of the baseband jammer noise which is used to adaptively cancel the jammer noise waveform in the receiver baseband after PN processing. The post-correlation nulling circuit 10 thus allows the adaptive antenna spatial nulling to concentrate on canceling wideband jammers. One skilled in the art will recognize that the post-correlation temporal nulling circuit 10 described herein with respect to GPS signals is for exemplary purposes only. The circuit 10 described in the present invention is not limited for use in an GPS configuration. Rather, the circuit 10 may be adapted to be used for post-correlation temporal nulling of any interference signals.

As is illustrated in FIG. 1, a GPS and interference signal are received by the antenna element 12. One skilled in the art will recognize that the antenna element 12 is typically part of a multi-element antenna array (not shown). In a GPS configuration, each element in the antenna array detects downlink signals from a constellation of GPS satellites (not shown). For illustrative purposes, however, only one channel is illustrated and described in detail in FIG. 1. Similar processing is provided for any other channels provided as part of the antenna array.

Each satellite in the GPS transmits signals on two frequencies known as $L_1$ (1575.42 MHz) and $L_2$ (1227.6 MHz) using spread spectrum techniques. The GPS signal is a PN-code modulated spread spectrum signal. Since each satellite utilizes different PN-codes, a signal transmitted by a particular satellite can be selected by generating and matching (correlating) the corresponding PN-code. A typical interference signal may be CW jammer waveform having a frequency 10 KHz above $L_1$.

Referring to FIG. 1, both the received GPS and interference signals detected by the antenna element 12 are applied to a mixer 14, where they are multiplied by a PN code generated by a replica PN code generator (not shown) to produce a demodulated GPS baseband signal and an interference noise signal which has been spread by the replica PN code used to correlate the received GPS signal. The PN-code is a replica of the PN-code utilized to modulate the received GPS signal. The demodulated GPS baseband and interference noise signals are then applied to mixers 16 and 18, which multiply the signals by orthogonal in-phase (1) and quadrature (Q) reference carrier signals, respectively, supplied by a local oscillator 20. Orthogonal baseband signals $I_{INT}$ and $Q_{INT}$ are generated by mixers 16 and 18, respectively, and applied to respective low pass filters for filtering of the interference noise components. For $I_{INT}$, the signal is represented by a vector that leads the $Q_{INT}$ vector by 90E. As illustrated in detail in FIG. 1, $I_{INT}$ signal is applied to low pass filter 22 for filtering of the interference noise signal. Similarly, $Q_{INT}$ signal is applied to a low pass filter (not shown) for filtering of the interference noise signal.

The interference signal at line 24 after PN code spreading is transformed into a lowpass Gaussian noise waveform in the receiver baseband, forming actual interference channel noise signals $I_{INTNOISE}$ and $Q_{INTNOISE}$ at the outputs of the respective low pass filters. As previously noted, since the original interference waveform is transformed into a Gaussian noise waveform after PN code processing, conventional frequency notch filtering techniques cannot be used to implement temporal nulling. To implement adaptive temporal interference cancellation, the actual interference channel noise $I_{INTNOISE}$ 24 is summed with the sum 62 of the $I_{REF}$ and $Q_{REF}$ lowpass filtered replica noises after they have been applied to the weighting networks 42 and 44, as described in detail below, to form an $NULLED_I$ output 26. Similarly, the actual interference channel noise $NULLED_Q$ (not shown) is summed with the output of the $I_{REF}$ and $Q_{REF}$ lowpass filtered replica noises after they have been applied to the weighting networks to form a $NULLED_Q$ output (not shown).

Referring to FIG. 1, the interference reference generator 28 is used to generate a signal having a frequency and waveform substantially similar to the actual interference signal. By knowing the frequency of the actual interference signal (for example, 10 KHz above $L_1$), an interference signal can be generated and used to adaptively cancel the actual undesired signal. The reference interference signal is initially applied to mixers 30 and 32, where I and Q reference interference signals are generated and mixed with the PN code to form $I_{REF}$ and $Q_{REF}$ signals which are applied to low pass filters 34 and 36, respectively. The PN code is a replica of the PN code utilized to produce the received GIPS and interference signals. For $Q_{REF}$, the signal is represented by a vector that leads the $I_{REF}$ vector by 90E. If the in-phase component of the interference signal reference generator is in-phase with the actual interference signal at baseband and has the same amplitude, then the interference noise signal $I_{INTNOISE}$ at the output of the lowpass filter 22 will be a replica of the noise in the noise estimate signal 38 $I_{REFNOISE}$ at the output of the lowpass filter 34. Similarly, the interference noise signal $Q_{INT}$ at the output of the lowpass filter (not shown) will be a replica of the noise in the noise estimate signal 40 $Q_{REFNOISE}$ at the output of the lowpass filter 36.

The weighting networks 42 and 44 will automatically compensate for any phase or amplitude mismatches in the noise estimate signals $I_{REFNOISE}$ and $Q_{REFNOISE}$ 38 and 40, respectively. In particular, if the noise estimate signal $I_{REFNOISE}$ is not in-phase with the actual interference signal noise in the I channel and/or if the amplitude of these noises are not equal, then a least mean square (LMS) algorithm automatically adjusts the $I_{REFNOISE}$ and $Q_{REFNOISE}$ weighting network multipliers to form a combined signal that cancels the actual interference signal noise in the I channel.

The output signals from the weighting networks 42 and 44 are summed with the actual interference channel noise $I_{INTNOISE}$ 24 to form a $NULLED_1$ output 26 as shown in FIG. 1. The values of the weighting network multipliers 54$i$ and 54$q$ are determined by the filtered cross-correlation product of the $NULLED_1$ output 26 and the noise estimate signals $I_{REF}$ and $Q_{REF}$ 38 and 40.

In particular, referring to FIG. 1, each weighting network 42 and 44 is comprised of a mixer 46, integrator 48 and multiplier 50 for generating weighted signals which are applied to a summer 52 for forming $I_{NULLED}$ 26 and $Q_{NULLED}$ (not shown) outputs. In operation, each of the noise estimate signals $I_{REFNOISE}$ and $Q_{REFNOISE}$ 38 and 40 are multiplied by weighting values which are produced by correlating the $I_{REFNOISE}$ and $Q_{REFNOISE}$ signals 38 and 40 with the $NULLED_1$ 26 or $NULLED_Q$ (not shown) signal. Referring to FIG. 1, the noise estimate signal $I_{REFNOISE}$ 38 is applied to the mixer 46 where it is multiplied with $NULLED_I$, 26. The signal generated from the mixer 46 is applied to the integrator 48 for integrating the signal to generate a weighting signal 54 which is applied to the multiplier 50. The multiplier 50 multiplies the noise estimate signals $I_{REFNOISE}$ 38 by the weighting signal 54 to generate an $I_{NOISE}$ signal 56 for input to a summer 60 which sums the $I_{NOISE}$ signal 56 with the corresponding $Q_{NOISE}$ signal 58 generated by the corresponding weight network 44.

One skilled in the art will recognize that a similar process is used to form a $NULLED_Q$ output. The received GPS signal is unaffected by the nulling process of the present invention. Thus, in accordance with the present invention, a replica "noise waveform" is generated and used to adaptively cancel the actual interference signal "noise waveform" after PN processing, thereby implementing post-correlation temporal nulling. The interference signal superimposed on each desired signal received is thus substantially eliminated from the combined signal.

Figure 2:
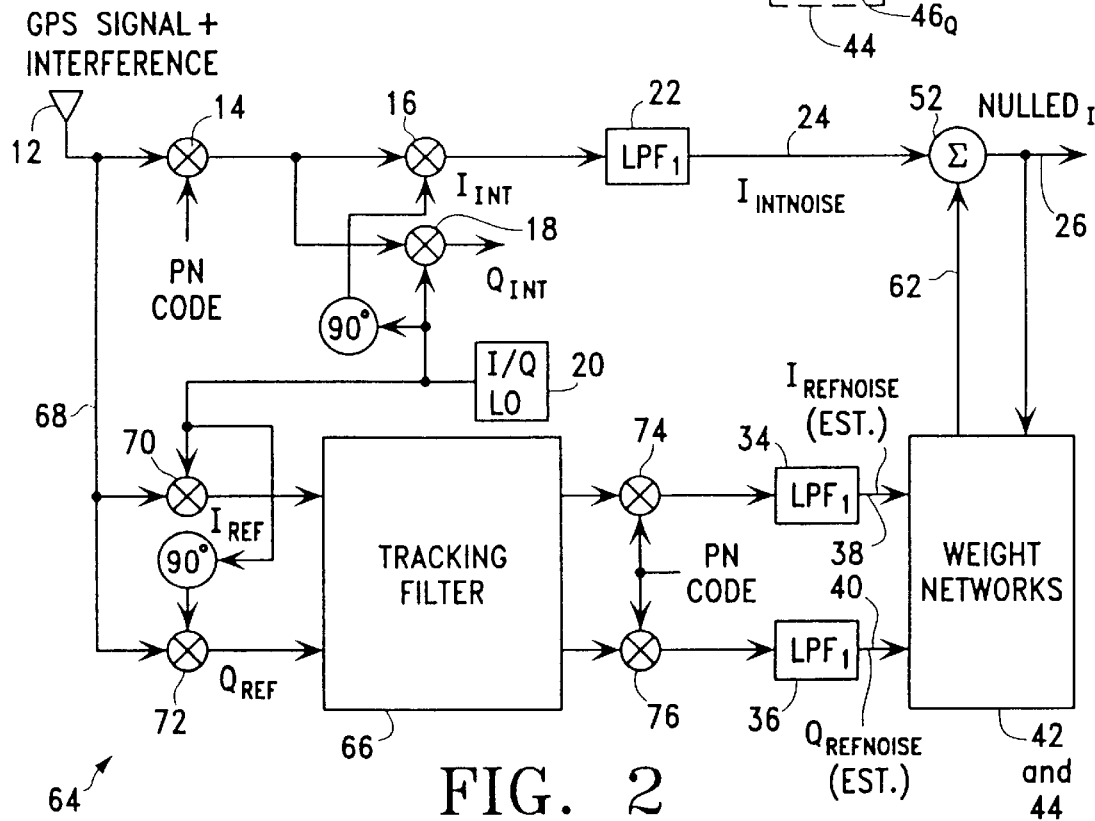
FIG. 2 is a simplified schematic block diagram of the post-correlation nulling circuit of FIG. 1 adapted for use with a tracking filter circuit in accordance with the present invention.

The interference signal may be received from an unspecified, variable direction such that the frequency and waveform of the actual interference signal may not be known. Referring to FIG. 2, in such case, a tracking filter 66 may be used with the post-correlation temporal nulling circuit 10 illustrated in FIG. 1 to derive the interference reference "noise replica" from the real interference signal. This is accomplished utilizing the post-correlation temporal nulling tracking filter circuit 64 of the present invention which includes a tracking filter 66 for tracking the interference signal 68 as illustrated in FIG. 2. The replica interference noise is derived directly from the interference signal 68 received by the antenna element 12. Referring to FIG. 2, an incoming GPS and interference signal is received by the antenna element 12. The derived interference signal 68 is applied to mixers 70 and 72 which generate quadrature signals $I_{REF}$ and $Q_{REF}$. These signals are applied to the tracking filter 62 which tracks the interference signal using an automatic frequency control (AFC) loop (not shown). The tracking filter 66, which comprises the AFC loop (not shown), low pass filter sections (not shown) and a direct digital synthesizer (not shown), sweeps across the GPS band looking for the interference signal. In a typical configuration, multiple filters are used to search for interference signals, with each filter covering a segment of the GPS band. One skilled in the art will recognize that the number of filters used can be varied. The filter that finds the interference signal will lock on and track the interference signal using the AFC loop (not shown) in the tracking filter 66 to follow the interference signal. The signals $I_{REF}$ and $Q_{REF}$ which are passed by the tracking filter 66 are applied to mixers 74 and 76, respectively, where they are mixed with the PN code which is a replica of the PN code utilized to demodulate the received GPS and interference signals, and then low pass filtered in filters 34 and 36, respectively. The noise estimate signals $I_{REFNOISE}$ and $Q_{REFNOISE}$ 38 and 40 at the outputs of low pass filters 34 and 36 are the noise estimate signals $I_{REFNOISE}$ and $Q_{REFNOISE}$ 38 and 40 described earlier with respect to FIG. 1 for implementing adaptive temporal nulling. In the embodiment shown in FIG. 2, however, the replica interference noise is derived directly from the interference signal. As described earlier, the weight networks 42 and 44 will automatically compensate for any phase or amplitude mismatches in the noise estimate signals $I_{REFNOISE}$ and $Q_{REFNOISE}$ 38 and 40.

For example, the interference signal may be a CW jammer appearing 2 MHz above the center of the GPS band. The tracking filter 66 of the present invention sweeps across the GPS band looking for the jammer. Multiple filters, five typically, search for the jammers. Each filter will be assigned to cover a segment of the GPS band. The received signal frequency of 2 MHz above band center falls within the passband of a tracking low-pass filter and is consequently followed and passed through the tracking filter 66. In particular, the filter that finds the jammer, 2 MHz above band center (i.e., the jammer at the $I_{REF}$ and $Q_{REF}$ outputs of mixers 70 and 72, respectively, is a 2 MHz CW signal), will lock on and track it using an AFC loop to follow any jammer or vehicle dynamics. The output from the tracking filter 66 is consequently passed through the filter and is processed similarly to that described with respect to FIG. 1.

The tracking filter 66 of the present invention allows for effective temporal nulling against a variety of jammer waveforms, including but not limited to AM, FM, CW, Pulsed or Swept CW, Narrow Band Noise, as long as the jammer waveform fits within, and is tracked by, the tracking filter 66. The use of the tracking filter 66 is necessary if the temporal nulling is to be used in conjunction with a post-correlation adaptive spatial nuller where it is desired to have the spatial degrees of freedom devoted to the nulling of wideband jammers. In that case, strong wideband jammers can overwhelm the temporal nulling if the tracking filter 66 is not used. In the present invention, the bandwidth of the low pass filters (not shown) in the tracking filter 66 are adaptively selectable in order to optimize the temporal nulling performance in the presence of wideband jamming. In such case, bandwidths of 1 KHz, 10 KHz, 100 KHz will be used for the low pass filters (not shown) in the tracking filter 66.

Figure 3:
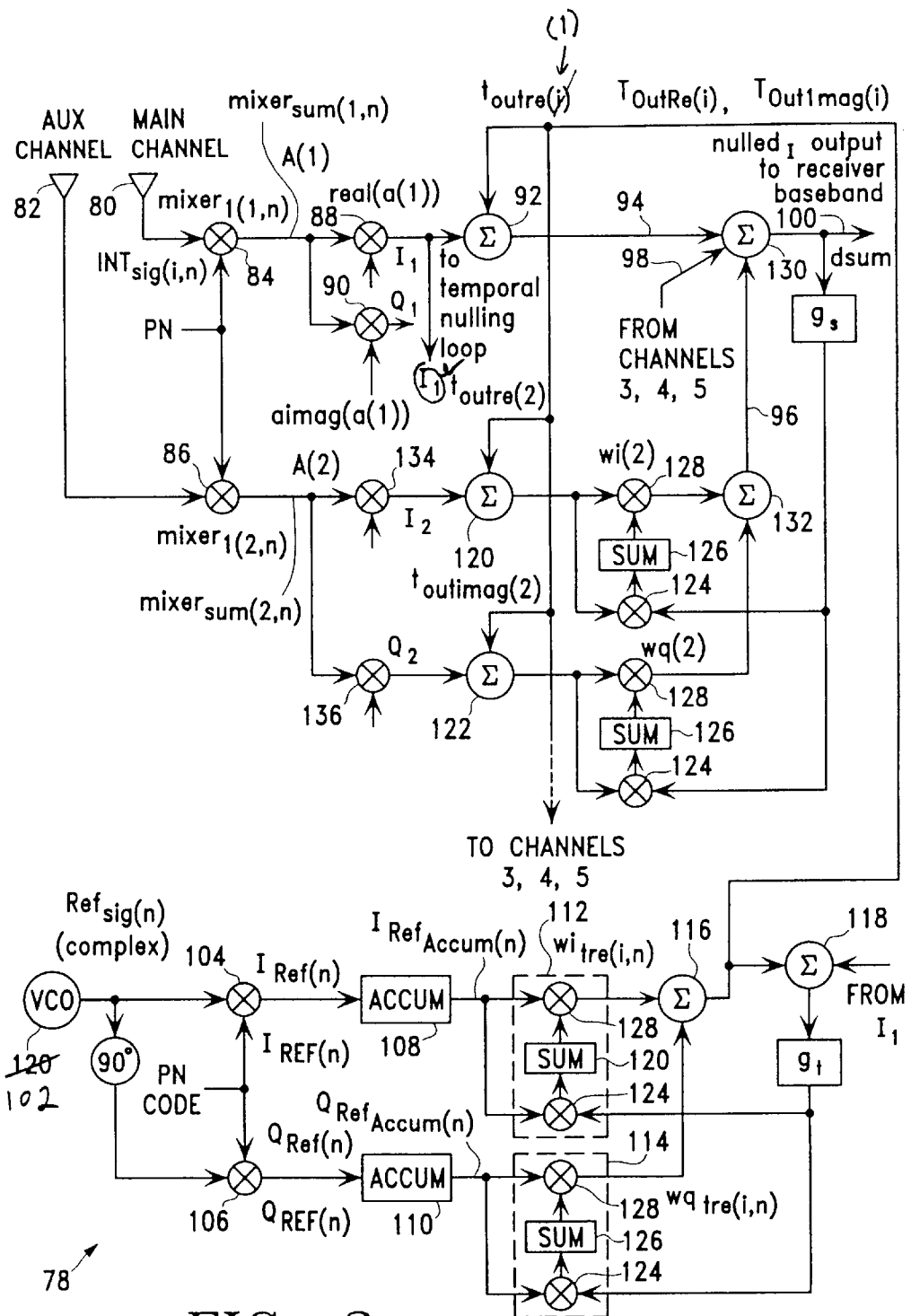
FIG. 3 is a schematic block diagram of the post-correlation spatial plus temporal nulling circuit in accordance with the present invention.

Referring to FIG. 3, a combined block diagram of the post-correlation spatial plus temporal nulling circuit 78 is shown. The spatial nulling loop shown is a simplified two-channel diagram of the AGR receiver by Assignee. Note that the subscript (i,n) is used in FIG. 3 to indicate the channel (or antenna element) number "i" (where, for a five element antenna "i" would equal 1, 2, 3, 4 or 5) and the temporal nulling loop number "n". For example, if it were desired to apply temporal nulling to three narrow band jammers, "n" would equal 3 and it would be required to implement 3 jammer replica circuits, up to and including 3 pairs of $I_{ref}$ and $Q_{ref}$ accumulators (shown as 108, 110). However, a single jammer replica circuit can generate the required nulling signal components, T OutRe(i), T OutImag (i), for more than one input channel. If there were a total of 6 jammers, say 3 CW and 3 broadband noise jammers, then the CW jammers would be removed (from the spatial nulling loop) by the temporal nulling loops (with n=3), and the spatial nulling loop would suppress the 3 broadband noise jammers. If there were 4 CW jammers and 2 broadband noise jammers, then 3 of the CW jammers would be nulled by the 3 temporal loops and the remaining CW jammer plus the 2 broadband jammers would be suppressed by the spatial nulling loops (assume, for example, a 5 element antenna array). The detection and "temporal filter assignment" for tracking the 3 CW jammers would be made by detection and tracking logic associated with the temporal tracking filters (not shown). As is illustrated in FIG. 3, the temporal nulling is accomplished by canceling the jammer noise in each of the I and Q outputs of each antenna channel. The phase and amplitude adjusted replica jammer noise, for each I and Q channel, is subtracted from the corresponding I or Q channel ahead of the spatial nulling loop. Thus, the temporal nulling function takes the narrowband jammers out of the spatial nulling loop, leaving the spatial loop the job of nulling the wideband jammers if any are present. The number of narrowband jammers that can be nulled is a function of the number of jammer replica loops that are implemented while the number of wideband jammers that can be nulled is a function of the number of antenna elements.

Referring to FIG. 3, the antenna array includes two elements, the main channel A(1) 80 and auxiliary channel A(2) 82. Both the received GPS and interference signal INT $_{Sig(1,n)}$ detected by the main and auxiliary channel antenna elements 80 and 82 are applied to mixers 84 and 86 (mixer $_{1(2,n)}$) and mixer $_{1(2,n)}$), respectively, where they are multiplied by a PN code generated by a replica PN code generator (not shown) to produce a mixer $_{sum(1,n)}$ output on the main channel 80 and a mixer $_{sum(2,n)}$ on the auxiliary channel 82. For the main channel A(1) 80, mixer $_{sum(1,n)}$ output is applied to mixers 88 and 90, respectively, which multiply the mixer $_{sum(1,n)}$ output by I and Q reference carrier signals to generate $I_1$ and $Q_1$ signals. The $I_1$ signal is applied to summer 92, which sums the $I_1$ signal with the weighted $t_{outre(1)}$ signal to produce an output on line 94 which is subsequently summed with the output from other channels on lines 96 and 98 to from a nulled, output 100. Although not shown, the $Q_1$ signal is similarly processed to produce a nulled $_Q$ output.

A reference signal generator Ref $_{sig(,n)(complex)}$ in the form of a voltage controlled oscillator (VCO) 102 or other generating device is used to generate a signal having a frequency and waveform substantially similar to the received interference signal INT $_{Sig(1,n)}$. By knowing the frequency of the received interference signal, an interference signal can be used to adaptively cancel the actual undesired signal received by the antenna array. In accordance with the present invention, in the case where the interference signal is received from an unspecified, variable direction such that the frequency and waveform of the actual interference signal may not be known, the tracking filter 62 illustrated in FIG. 2 may be used with the post-correlation spatial plus temporal nulling circuit 78 illustrated in FIG. 3 to derive the interference reference "noise replica" from the real interference signal INT $_{Sig(1,n)}$. Referring to FIG. 3, the reference interference signal generated by the VCO 102 is initially applied to mixers 104 and 106, where I and Q reference interference signals are generated and mixed with the PN code to form $I_{Ref(n)}$ and $Q_{Ref(n)}$ signals. The PN code is a replica of the PN code utilized to produce the received GPS and interference signals. For $Q_{Ref(n)}$, the signal is represented by a vector that leads the $I_{Ref(n)}$ vector by 90E. $I_{Ref(n)}$ and $Q_{Ref(n)}$ signals are applied to accumulators 108 and 110, respectively, which produce $I_{RefAccum(n)}$ and $Q_{RefAccum(n)}$ signals which are applied to weighting networks 112 and 114 ($Wi_{tre(i,n)}$ and $wq_{tre(i,n)}$), respectively. The weighting networks 112 and 114 automatically compensate for any phase or amplitude mismatches in the $I_{RefAccum(n)}$ and $Q_{RefAccum(n)}$ signals. In particular, if the $I_{RefAccum(n)}$ signal is not in-phase with the actual interference noise signal $I_1$ and/or if the amplitude of these noises are not equal, then the LMS algorithm automatically adjusts the weighting network multipliers to form a combined signal that cancels the real or actual interference signal $I_1$ in the I channel.

The output of the weighting networks 112 and 114 are applied to summer 116, whose output is applied to the summers 92, 120 and 122 from the main 80, auxiliary 82 and any other channels to eventually form a Nulled$_I$ output which is applied to the receiver baseband. The output from summer 116 is also applied to summer 118, where they are summed with the actual interference channel noise $I_1$, to form a weighted value to be applied to each weighting network 112 and 114.

In particular, as described with respect to FIG. 1, each weighting network 112 and 114 includes a mixer 124, integrator 126 and multiplier 128 for generating weighted signals which are applied to a summer 116 which are eventually used to generate nulled, and nulled$_Q$ (not shown) outputs. In operation, each of the noise estimate signals $I_{RefAccum(n)}$ and $Q_{RefAccum(n)}$ are multiplied by weighting values. The output from each weighting network 112 and 114 is added together in summer 116 to form a weighted $t_{outre(i)}$ signal, which is applied to summer 92 which sums the $t_{outre(i)}$ signal with the corresponding actual 11 signal to generate a signal on line 94. The weighted output is applied to the remaining channels where the weighted $t_{outre(i)}$ output is applied to summers which sum the $t_{outre(i)}$ signal with the corresponding channel actual I and Q signals. For example, as illustrated in FIG. 3, the weighted $t_{outre(2)}$ signal is added with the actual $I_2$ and $Q_2$ signals via summers 120 and 122, respectively. The output from the summers are accordingly weighted via weighting networks wi(2) and wi(q), which each include a mixer 124, integrator 126 and multiplier 128. The output from the main channel summer 92 is added to the weighted signals from the other channels via summer 130 to form a Nulled$_I$ output 100 which is applied to the receiver baseband.

In particular, as is illustrated in FIG. 3, each auxiliary channel two weighting network wi(2) and wi(q) is used for generating weighted signals which are produced by correlating the actual $I_2$ and $Q_2$ signals with the Nulled$_I$ output 100. The output from the multipliers 128 are added by the summer 132 and then applied to the summer 130 for forming a Nulled$_I$ output 100.

As previously noted, although the temporal nulling described above uses an assumed knowledge of the frequency and waveform of the interference signal, the same results would be obtained if the interference replica was derived directly from the interference signal.

Figure 4:
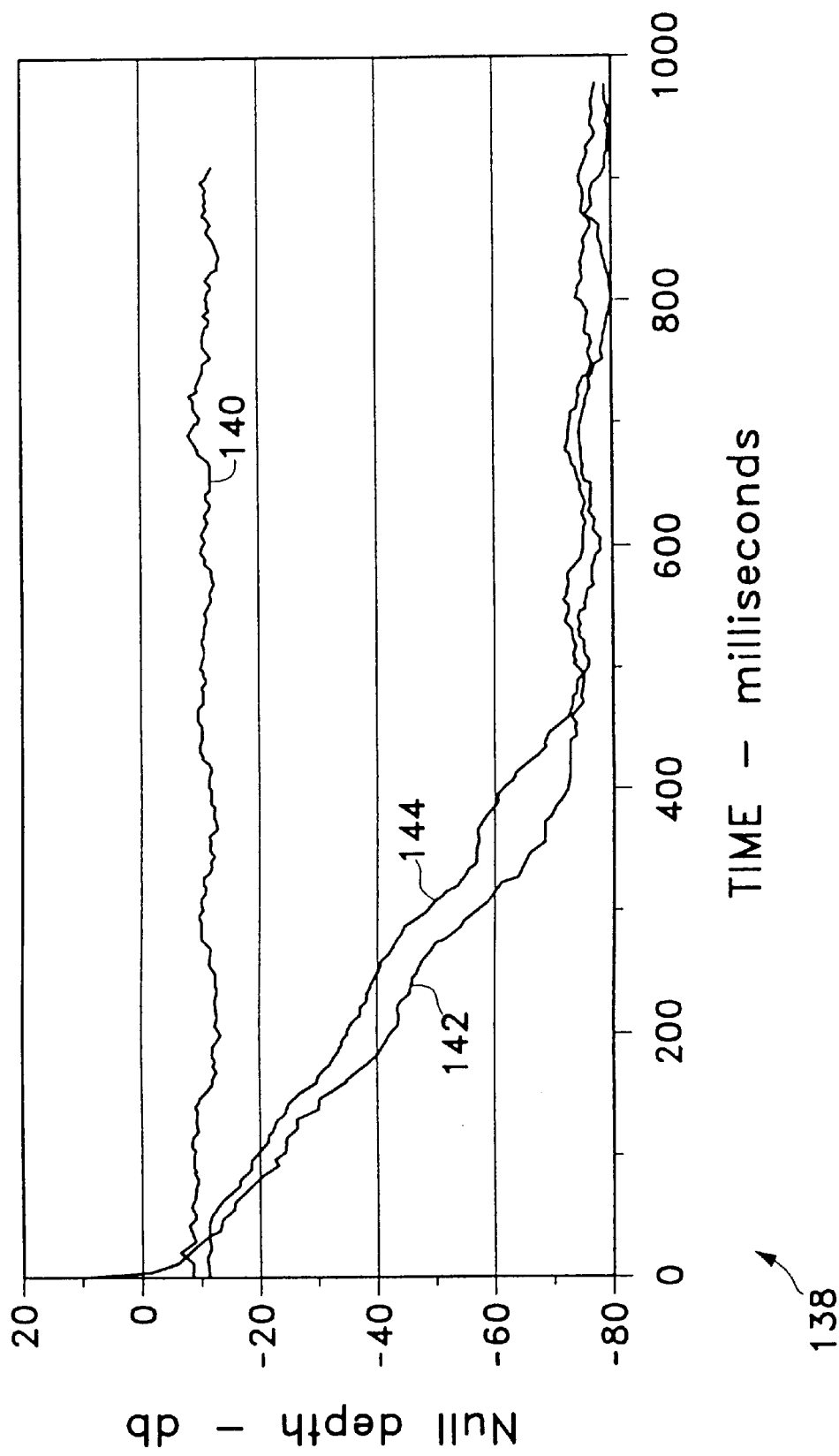
FIG. 4 is a graph of the combined nulling simulation results with six jammers in accordance with the present invention.

Referring to FIG. 4, a graph 138 of the combined nulling simulation results with six jammers, three broadband noise jammers and three CW jammers, each equal to 100 db J/S (i.e., 100 db above the GPS satellite signal level) is illustrated. The broadband jammers are at 45, 135 and 225 degrees az and the CW jammers are at 255, 310 and 345 degrees az. The top trace 140 shows the lack of nulling with six jammers and just the five element AGR spatial nulling operating. This is to be expected since a five element spatial nuller has four degrees of freedom and thus can only null four jammers. The bottom trace 142 shows the spatial nuller canceling the three broadband noise jammers (only three jammers used in this case). The middle trace 144 shows the combined spatial plus temporal nulling of the present invention canceling all six jammers. The transient response is almost the same as for the case of the three broadband jammers and spatial nulling only. This result shows the effective synergy between the spatial and temporal nulling produced by the present invention.

It will be appreciated by persons skilled in the art that the present invention is not limited to what has been shown and described hereinabove, nor the dimensions of sizes of the physical implementation described immediately above. The scope of invention is limited solely by the claims which follow.

What is claimed is:

1. A circuit for nulling a received interference signal from a received code modulated signal, comprising:
   a correlator for correlating said received interference signal and said received code modulated signal with a replicate code to generate an interference noise signal and a demodulated signal;
   a first processor for generating actual orthogonal interference signals based upon said actual interference noise signal;
   a generator for producing a replicate interference signal having a frequency and waveform substantially similar to said received interference signal;
   a second processor for generating replicate orthogonal signals based upon said replicate interference signal and encoding said replicate orthogonal signals with said replicate code to generate replicate noise signals;
   weighting means for weighting said replicate noise signals to generate weighted replicate noise signals; and
   a combiner for combining said weighted replicate noise signals with said actual orthogonal interference signals to produce a sum signal in which said actual orthogonal interference signals are nulled.

2. The circuit claimed in claim 1, wherein said received interference signal comprises a jamming signal and said received code modulated signal comprises a GPS signal.

3. The circuit claimed in claim 1, wherein said generator for producing a replicate interference signal having a frequency and waveform substantially similar to said received interference signal, further comprises:
  a tracking circuit for tracking said received interference signal.

4. The circuit claimed in claim 3, wherein said tracking circuit further comprises:
  means for deriving said replicate interference signal directly from said received interference signal.

5. The circuit claimed in claim 4, wherein said tracking circuit further comprises:
  a plurality of filters each covering a portion of a frequency band of said received code modulated signal for tracking said received interference signal.

6. The circuit claimed in claim 1, wherein said received code modulated signal is a PN-code modulated signal.

7. The circuit claimed in claim 1, wherein said first processor for generating actual orthogonal interference signals based upon said actual interference noise signal comprises generating in-phase and quadrature-phase components; and
  said second processor for generating replicate orthogonal signals based upon said replicate interference signal comprises generating in-phase and quadrature-phase components.

8. The circuit claimed in claim 1, wherein said received interference signal and said received code modulated signal are received by at least one antenna element.

9. The circuit claimed in claim 8, wherein said weighting means combines said actual orthogonal interference signals and said weighted replicate noise signals from each antenna element to produce a sum signal for each antenna element.

10. The circuit claimed in claim 9, further comprising:
  additional weighting networks for combining said sum signals from each of said antenna elements for producing a nulled signal.

11. A method for nulling a received interference signal from a received code modulated signal, comprising the steps of:
  correlating said received interference signal and said received code modulated signal with a code which is a replica of said received code to generate an actual interference noise signal and a demodulated signal;
  generating actual orthogonal interference signals based upon said actual interference noise signal;
  generating a replicate interference signal having a frequency and waveform substantially similar to said received interference signal;
  generating replicate orthogonal signals based upon said replicate interference signal and encoding said replicate orthogonal signals with said replica code to generate replicate noise signals; and
  weighting said replicate noise signals to generate weighted replicate noise signals; and
  combining said weighted replicate noise signals with said actual orthogonal interference signals to produce a sum signal in which said actual orthogonal interference signals are nulled.

12. The method claimed in claim 11, wherein said received interference signal comprises a jamming signal and said received code modulated signal comprises a GPS signal.

13. The method claimed in claim 11, wherein said step of generating a replicate interference signal having a frequency and waveform substantially similar to said received interference signal, further comprises the step of:
  tracking said received interference signal.

14. The method claimed in claim 13, wherein said step of tracking said received interference signal further comprises the step of:
  deriving said replicate interference signal directly from said received interference signal.

15. The method claimed in claim 14, wherein said step of tracking said received interference signal further comprises the step of:
  tracking said received interference signal with a plurality of filters each covering a portion of a frequency band of said received code modulated signal.

16. The method claimed in claim 11, wherein said received code modulated signal is a PN-code modulated signal.

17. The method claimed in claim 11, wherein said step of generating actual orthogonal interference signals based upon said actual interference noise signal comprises the step of generating in-phase and quadrature-phase components; and
  said step of generating replicate orthogonal signals based upon said replicate interference signal comprises the step of generating in-phase and quadrature-phase components.

18. The method claimed in claim 11, further comprising the step of:
  receiving said received interference signal and said received code modulated signal from at least one antenna element.

19. The method claimed in claim 18, wherein said step of weighting said replicate noise signals to generate weighted replicate noise signals, further comprises the step of:
  combining said actual orthogonal interference signals and said weighted replicate noise signals from each antenna element to produce a sum signal for each antenna element.

20. The method claimed in claim 19, further comprising the steps of:
  weighting said sum signals from each of said antenna elements and combining said sum signals to produce a nulled output.

* * * * *